Feb. 10, 1925.
A. C. SAVIDGE
STEERING GEAR ATTACHMENT
Filed March 12, 1923
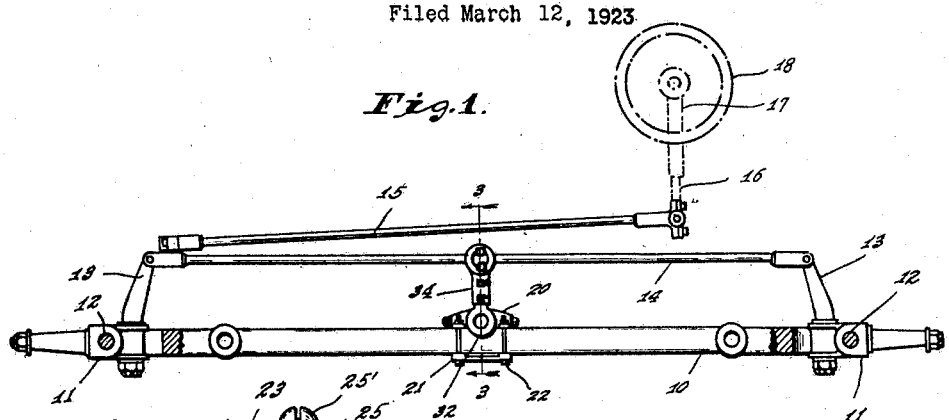
INVENTOR.
ALBERT C. SAVIDGE,
BY
ATTORNEY.

Patented Feb. 10, 1925.

1,525,660

UNITED STATES PATENT OFFICE.

ALBERT C. SAVIDGE, OF INDIANAPOLIS, INDIANA, ASSIGNOR OF ONE-SIXTH TO JOHN H. SCHUESSLER, ONE-SIXTH TO KRYN T. VYVERBERG, ONE-SIXTH TO RUDOLPH C. EISENBACH, ONE-SIXTH TO WILLIAM H. CASON, ALL OF LAFAYETTE, INDIANA, AND ONE-SIXTH TO RUSSELL G. ROWLAND, OF INDIANAPOLIS, INDIANA.

STEERING-GEAR ATTACHMENT.

Application filed March 12, 1923. Serial No. 624,374.

*To all whom it may concern:*

Be it known that I, ALBERT C. SAVIDGE, a citizen of the United States, residing at Indianapolis, in the county of Marion and State of Indiana, have invented a new and useful Steering-Gear Attachment, of which the following is a specification.

It is the object of my invention to produce a simple and effective steering device for relieving the strain on the driver of an automobile in which the steering gear is not of the irreversible type, as in the Ford car; by providing a simply constructed spring-device which can be applied easily and cheaply to the existing cars and when in place tends to hold the front wheels of the car resiliently in straight-ahead position.

The accompanying drawing illustrates my invention:

Fig. 1 is a plan, in partial section, of the front axle of a well-known type of automobile, with the usual steering knuckles and steering mechanism, and with my steering device applied thereto; Fig. 2 is an enlarged horizontal fragmental section, in partial plan, through my steering device on the line 2—2 of Fig. 3; and Fig. 3 is a vertical section on the scale of Fig. 2 on the line 3—3 of Figs. 1 and 3.

The front axle 10, which is attached to the chassis in any convenient manner, is provided with the usual steering knuckles 11, pivoted to the ends of the axle on the usual pivotal supports 12, and having the usual rearwardly extending arms 13 interconnected by the usual link or connecting rod 14 the two ends of which are pivotally connected to the respective arms 13; and one end of the link 14, or one of the arms 13, is connected by a rod 15 to an arm 16 on a steering post 17 operable by the usual steering wheel 18. This is of standard construction, and is indicated only diagrammatically.

My present invention provides a spring-device of novel construction acting between the axle 10 and the link 14 and tending to hold such link and the steering knuckles 11 in a given position relative to the axle 10, so that the guiding wheels on the steering knuckles will be in the straight-ahead position. I am aware that spring devices for this purpose are old, and, in fact, such a device is shown in my prior Patent No. 1,131,796, granted march 16, 1915; but my present invention is a development, simplification, and improvement over such prior devices, including that shown in my aforesaid prior patent.

By my present invention, I provide a hollow spring-casing 20, which is mounted on the rear face of the axle 10 at about the middle thereof and clamped to the axle by a clamping plate 21 and suitable clamping bolts 22, of which latter there are preferably four. The spring-casing 20 has suitable bolt-lugs 23 and positioning fingers 24, for bearing against the rear of the axle 10 and positioning the spring-casing on said axle and for receiving the clamping bolts 22. The spring casing 20 is a single hollow casting, wide at the middle and narrow at the ends, with one of the two narrow ends, and preferably both of them, open throughout the height of the spring-casing to give access thereto when the closing plates 25 provided at such ends are removed. The end-closing plates 25 are attached to the open ends of the spring-casing casting, by suitable attaching screws 25′, usually two for each closing plate. On the upper side at the center, the spring-casing casting has a vertical bearing-hole 26, while directly below on the inside of the under face of said casting is a bearing recess 27, which does not project through the casting but is provided in a boss 28 on the under face thereof. The bearing hole 26 and the bearing-recess 27 are vertically alined, and pivotally support upper and lower cylindrical parts 29 and 30 of a downwardly projecting pivot or bearing member 31 at the forward or pivotal end of a rearwardly projecting arm 32, which projects rearward for co-operation with the link 14.

The arm 32 is preferably made as an extension arm, of two parts 33 and 34 which are superposed and one of which is longitudinally slotted to receive clamping bolts 35 co-operating with the other part: by the loosening of which bolts the arm may be adjusted to any desired effective length, which may be maintained by tightening such clamping bolts. The rear or swinging end of the arm 32 is enlarged and vertically perforated, to receive pivotally a rotatable plug 36 which is provided at its upper edges with a flange 37 overhanging the edge of the wall of the hole in the end of the arm 32. A U-bolt 38 is carried by the plug 36, and embraces the link 14, passing beneath such link and having its two ends projecting upward through such plug to receive clamping nuts 39 at their upper ends. The plug 36 can be withdrawn upward from its bearing hole in the arm 32 when it is not attached to the link 14 by the U-bolt 38, but is held from being withdrawn downward from such hole by the overhanging flange 37, which also largely keeps dirt and water out of such hole. When the plug is attached to the link 14, however, it is wholly locked in such hole because the link crosses the lower end of the plug and the lower end of the hole. The plug 36 has downwardly projecting notched flanges 40 which fit on the upper side of the link 14 to prevent relative turning of the link and plug.

Between the two bearing parts 29 and 30, the pivot 31 has a relatively flattened portion 44 to provide opposite relatively flattened spring-bearing surfaces 45. Two leaf springs 46, each comprising a plurality of leaves, may be inserted into the spring-casing 20 from either openable end thereof, when the closing plate 25 is removed, and at their middles bear oppositely against the two flattened spring-bearing faces 45, while at their ends they bear outward against the inner faces of the side walls of the spring-casing. The several leaves of each spring 46 are preferably of different lengths, the shortest being toward the bearing faces 45; as this permits the possibility of relative sliding between springs, and reduces friction and wear on such bearing faces. The leaf springs 46 tend to straighten, and by their co-operation with the flattened portion 44 they tend to set such flattened portion lengthwise of the spring-casing 20 whenever it is turned in either direction from such position. This flattened portion 44 has its long dimension perpendicular to the arm 32, so that by its interaction with the springs 46 it always tends to swing the arm 32 to an intermediate position in which such arm extends directly backward from the spring-casing 20, and tends to move such arm to that position whenever it is turned in either direction therefrom.

As the spring-casing 20 is wholly closed at bottom and ends, and has only the two end openings which are closed by the plates 25 and the top opening through which the pivot 31 extends down into it, it may be completely filled with grease or other lubricant, and will retain such lubricant indefinitely because it has no openings through which such grease can escape. To aid this purpose, suitable gaskets 47 may be provided beneath the end-closing plates 25. This makes all the parts within the spring-casing work in grease, with substantially no attention after being installed.

Further, the flattened portion 44 is wholly within the circumference of the cylindrical portion 29 and 30, so that the pivot may be inserted and removed readily through the hole 26. When the pivot 31 is in place in the spring-casing 20, it is locked there by the springs 46 when they are in place, as such springs extend over the cylindrical portion 30 and thus while in place in the spring-casing prevent the pivot from being removed. This makes a very simple self-locking assembly. If for any reason it is desired to remove the pivot, the two end-closing plates 25 are first removed and the springs 46 are thus pushed out through one now-open end of the spring-casing.

To install my steering device, the spring-casing 20 is attached to the axle 10 by the clamping plate 21 and clamping bolts 22; preferably at about the middle of the axle 10 though this is not essential. Then the plug 36 is clamped to the link 14, by the U-bolt 38, preferably at about the middle of such link 14 though that also is not essential. In any case, the spring-casing 20 and plug 36 are clamped to the axle 10 and link 14, respectively, in such positions that with the arm 32 in the position to which it is pressed by the springs 46 the guiding wheels on the steering knuckles 11 are in straight-ahead position. When the device as thus installed is in operation, the driver steers the car in the usual way. As he turns the steering knuckles 11 to swing the car either to the right or to the left, the link 14 is shifted endwise and carries with it the rear end of the arm 32, thus rotating the pivot 31 so that the flattened portion 44 further bows the leaf springs 46. As the driver returns his steering wheel 18 to the straight-ahead position, he is assisted in this by the action of the now straightening springs 46. More important, however, the action of the springs 46 on the flattened portion 44 tends to hold the steering knuckles 11 in the straight-ahead position, so that the driver may be relieved of much of the strain of holding the steering wheel 18 in this position, thus making driving less tiresome.

I claim as my invention:

1. A steering device, comprising a hollow spring-casing, an arm having a pivot mounted in said spring-casing, said pivot having a flattened part within said spring-casing, and a leaf-spring mounted in said spring-casing and bearing on said flattened part, said spring-casing having an openable end through which the leaf-spring may be inserted and withdrawn endwise.

2. A steering device, comprising a hollow spring-casing, an arm having a pivot mounted in said spring-casing, said pivot having a flattened part within said spring-casing, and a leaf-spring mounted in said spring-casing and bearing on said flattened part, said pivot having a lateral projection beyond said flattened part to co-operate with the edge of the leaf-spring to lock the pivot in its mounting.

3. A steering device, comprising a hollow spring-casing, an arm having a pivot mounted in said spring-casing, said pivot having a flattened part within said spring-casing, and a leaf-spring mounted in said spring-casing and bearing on said flattened part, said spring-casing having an openable end through which the leaf-spring may be inserted and withdrawn endwise, and said pivot having a lateral projection beyond said flattened part to co-operate with the edge of the leaf-spring to lock the pivot in its mounting.

4. A steering device, comprising a hollow spring-casing, an arm having a pivot mounted in said spring-casing, said pivot having a flattened part within said spring-casing, and a leaf-spring mounted in said spring-casing and co-operating with said pivot at said flattened part to spring-press the arm to a given position and to lock the pivot in its mounting.

5. A steering device, comprising a hollow spring casing internally wide at the middle and narrow at the ends and having a transverse bearing open only at the top, an arm having a pivot mounted in said bearing, said pivot having a flattened part, said spring-casing being normally closed but openable at at least one end, and a leaf-spring insertible through a narrow openable end of said spring casing to co-operate with said flattened part.

6. A steering device, comprising a hollow spring casing internally wide at the middle and narrow at the ends and having a transverse bearing, an arm having a pivot mounted in said bearing, said pivot having a flattened part, said spring-casing being openable at at least one end, and a leaf-spring insertible through a narrow openable end of said spring casing to co-operate with said flattened part.

7. A steering device, comprising a hollow spring casing internally wide at the middle and narrow at the ends and having a transverse bearing open only at the top, an arm having a pivot mounted in said bearing, said pivot having a flattened part, said spring-casing being normally closed but openable at at least one end, and a leaf-spring insertible through a narrow openable end of said spring casing to co-operate with said flattened part to spring-press the arm to a given position and lock the pivot in place.

8. A steering device, comprising a hollow spring casing internally wide at the middle and narrow at the ends and having a transverse bearing, an arm having a pivot mounted in said bearing, said pivot having a flattened part, said spring-casing being openable at at least one end, and a leaf-spring insertible through a narrow openable end of said spring casing to co-operate with said flattened part to spring-press the arm to a given position and lock the pivot in place.

9. A steering device, comprising a support, an arm pivotally mounted in said support, a spring acting between said arm and said support to spring-press the arm to a given position relative to the support, said arm having a hole at a point remote from the pivot, a plug pivotally mounted in said hole and constructed to hold itself from withdrawal from the hole in one direction, and an attaching device for fastening said plug to a rod which crosses both it and the hole at the hole-end from which the plug cannot be withdrawn.

10. A steering device, comprising a hollow spring-casing, an arm having a pivot mounted in said spring-casing, said pivot having a flattened part within said spring-casing, and a leaf-spring mounted in said spring-casing and bearing on said flattened part, said leaf-spring comprising a plurality of leaves which can slide relatively to one another.

11. A steering device, comprising a hollow spring-casing, an arm having a pivot mounted in said spring-casing, said pivot having a flattened part within said spring-casing, and a leaf-spring mounted in said spring-casing and bearing on said flattened part at an intermediate point and on the spring-casing at the ends, said leaf-spring comprising a plurality of leaves of successively increasing length with the shortest leaf toward the pivot.

12. A steering device, comprising a support for attachment to an axle, an arm having a pivot mounting in said support, a plug pivotally mounted in the end of said arm for attachment to a link of the steering mechanism, said arm being adjustable in length to vary the distance from said plug to said pivotal mounting, and a spring acting on said arm tending to move it to a predetermined position.

In witness whereof, I have hereunto set my hand at Indianapolis, Indiana, this 15th day of February, A. D. one thousand nine hundred and twenty-three.

ALBERT C. SAVIDGE.